United States Patent [19]

Peterson

[11] Patent Number: 5,086,861
[45] Date of Patent: Feb. 11, 1992

[54] ELECTRIC REAR WHEEL STEERING ACTUATOR

[76] Inventor: Donald W. Peterson, 11509 Farmhill, Fenton, Mich. 48430

[21] Appl. No.: 505,715

[22] Filed: Apr. 6, 1990

[51] Int. Cl.$^5$ .............................................. B62D 5/04
[52] U.S. Cl. ..................................... 180/79.1; 280/91
[58] Field of Search ................. 180/79.1, 140; 280/91; 74/388 PS

[56] References Cited

U.S. PATENT DOCUMENTS

| | | | |
|---|---|---|---|
| 4,653,602 | 3/1987 | Anders et al. | 180/79.1 |
| 4,666,014 | 5/1987 | Carlson et al. | 180/79.1 |
| 4,694,925 | 9/1987 | Roberts | 180/79.1 |
| 4,705,131 | 11/1987 | Shibahata et al. | 180/140 |
| 4,719,981 | 1/1988 | Miyoshi | 180/140 |
| 4,842,089 | 6/1989 | Kimbrough et al. | 180/79.1 |
| 4,895,383 | 1/1990 | Abe et al. | 180/79.1 |
| 4,953,650 | 9/1990 | Ohmura | 180/79.1 |

FOREIGN PATENT DOCUMENTS

| | | | |
|---|---|---|---|
| 12457 | 1/1987 | Japan | 180/79.1 |
| 30928 | 2/1987 | Japan | 180/79.1 |
| 87371 | 4/1988 | Japan | 280/91 |
| 93673 | 4/1988 | Japan | 180/79.1 |

Primary Examiner—Charles A. Marmor
Assistant Examiner—Kevin Hurley

[57] ABSTRACT

An apparatus for moving an object along a linear path, such as a tie rod end in a vehicle steering system, includes a generally tubular housing, an electric motor having a rotatable output shaft, a planetary gear set having an input attached to the output shaft and an output and a ball screw assembly having a rotatable nut attached to the planetary gear set output and a screw driven along a linear path of movement by the nut and adapted to be attached to an object to be moved, the output shaft, the planetary gear set and the ball screw assembly sharing a common longitudinal axis with the housing. The apparatus also includes a position sensor mounted on the housing for sensing the position of the screw along the path of movement and generating a sensor signal representing the position and a brake means attached to the output shaft whereby when the electric motor is actuated, the output shaft rotates the planetary gear set and the nut to move the screw along the path and when the screw reaches a predetermined position along the path, the brake is actuated to stop the rotation of the output shaft.

8 Claims, 4 Drawing Sheets

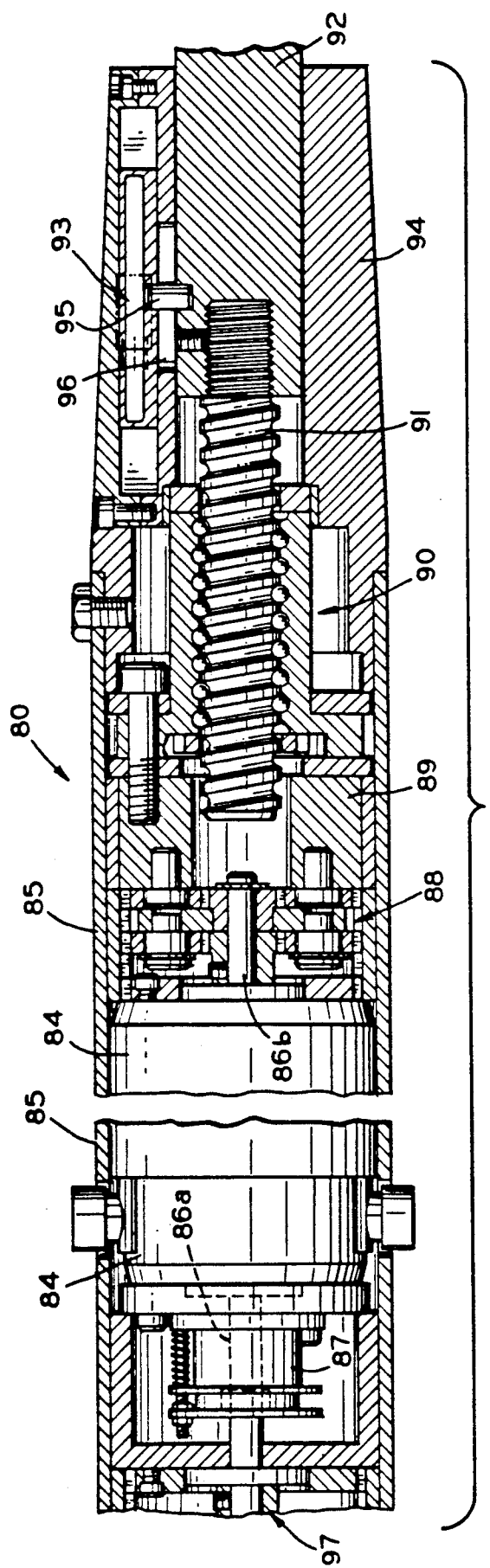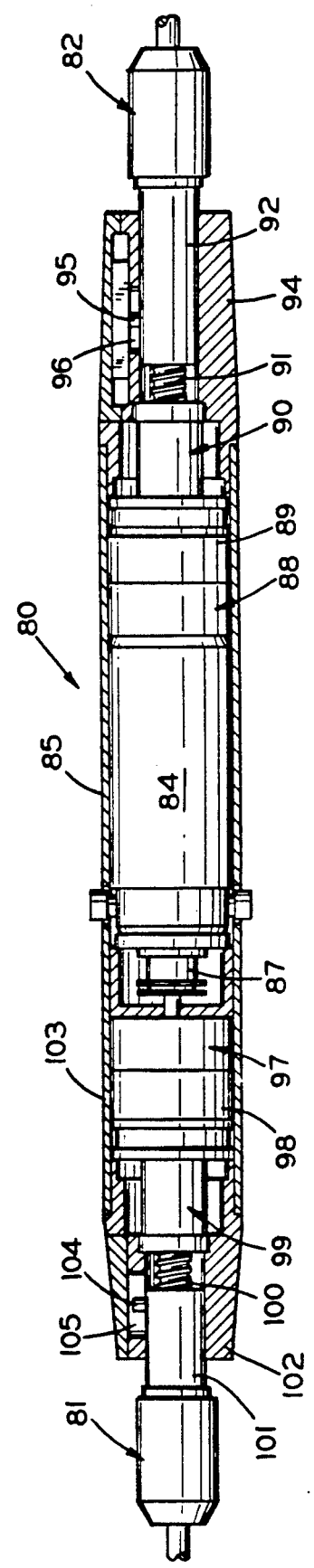
FIG. 5
FIG. 6

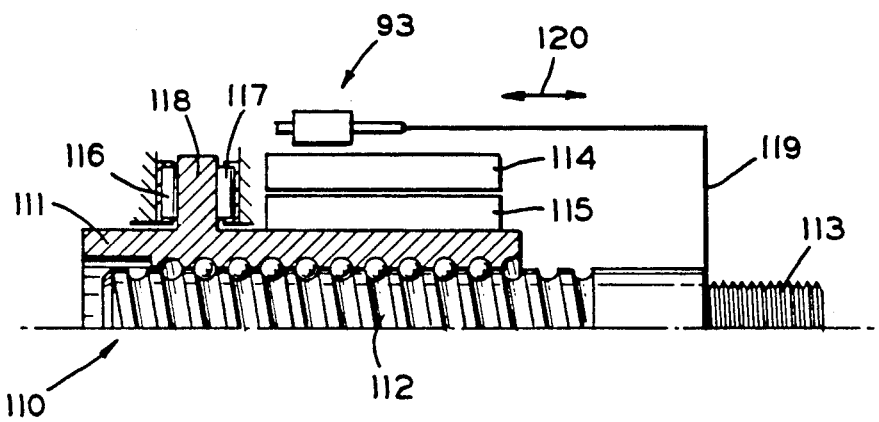
FIG. 7
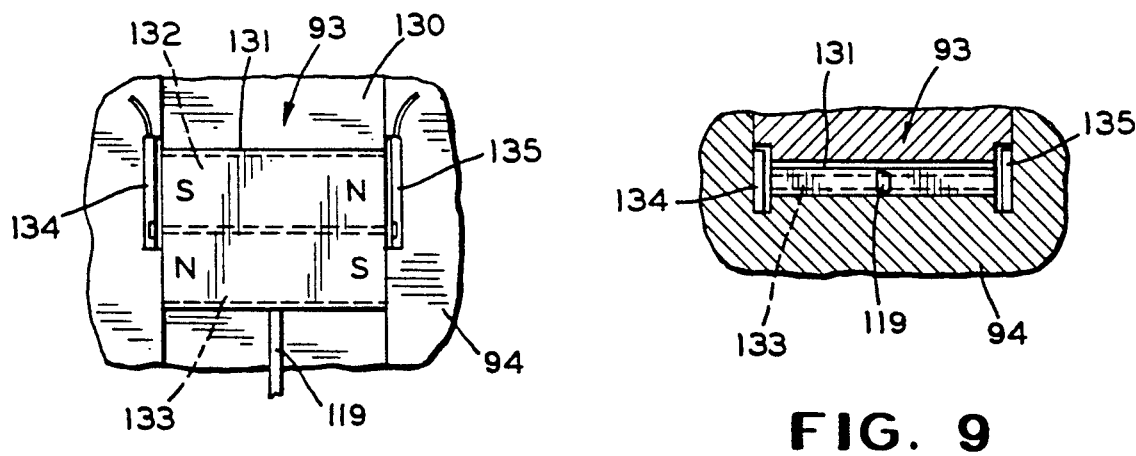
FIG. 8            FIG. 9

ELECTRIC REAR WHEEL STEERING ACTUATOR

BACKGROUND OF THE INVENTION

The present invention relates generally to an electric actuator apparatus and, in particular, to an apparatus for actuating vehicle all-wheel steering systems.

Early all-wheel steering systems were generally applied to agricultural and construction vehicles. Since such types of vehicles typically are provided with hydraulic systems, the steering system was powered by hydraulic actuators.

Early four-wheel steering systems for automotive type vehicles steered both the front and rear wheels through steering gear mechanisms. The transfer function between the steering input produced by the driver and the front wheel steering angle, and the transfer function between the steering input and the rear wheel steering angle were both determined by the steering gear mechanism. However, in U.S. Pat. No. 4,705,131, a vehicle steering control system is shown in which the transfer functions for the front wheel steering angle and the rear wheel steering angle are different so as to obtain optimum cornering characteristics for the vehicle. This steering system has a steering input sensor, a vehicle speed sensor, means for determining the transfer function for the front wheels from a steering frequency and a vehicle speed, means for determining the transfer function of the rear wheels, a front wheel actuator for steering the front wheels, and a rear wheel actuator for steering the rear wheels. The means for determining the transfer function of the rear wheels may be an electronic circuit, or a hydraulic fluid flow restrictor such as an orifice, or mechanical gearing.

In U.S. Pat. No. 4,719,981, a four-wheel steering system includes a steering wheel, a front wheel turning mechanism for turning the front wheels in response to the operation of the steering wheel, and a rear wheel turning mechanism which turns the rear wheels in response to operation of the steering wheel and is provided with an electric actuator for changing the position of a moveable member the position of which determines a rear wheel turning angle ratio. The rear wheel turning angle ratio is the ratio of the turning angle of the rear wheels to the turning angle of the front wheels for a given turning angle of the steering wheel. A control circuit receives a vehicle speed signal from a vehicle speed sensor and controls the electric actuator according to the detected vehicle speed so that a target rear wheel turning angle ratio determined in advance according to the vehicle speed is obtained. A preset vehicle speed detector detects a preset vehicle speed and a rear wheel turning angle ratio detector detects the actual rear wheel turning angle ratio. A correction circuit receives signals from the preset vehicle speed detector and the rear wheel turning angle ratio detector and controls the electric actuator to change the position of the moveable member so that the actual rear wheel turning angle ratio coincides with the target rear wheel turning angle ratio at the preset vehicle speed.

U.S. Pat. No. 4,842,089 discloses a rear steering control system employing separate closed-loop feedback control and open-loop feedforward control paths. The response characteristics of the open-loop and closed-loop control paths are separately scheduled to optimize the overall system performance. A computer based control unit controls separate electric motors for turning the front and rear wheels.

SUMMARY OF THE INVENTION

The present invention concerns an actuator for moving an object a predetermined linear distance. The actuator has a generally tubular housing enclosing an electric motor having a rotatable output shaft. A planetary gear set is enclosed in said housing and has an input attached to the output shaft and an output attached to a rotatable nut of a ball screw assembly enclosed in the housing. A screw of the ball screw assembly is adapted to be attached to an object to be moved. A dual actuator version utilizes a single electric motor to drive two sets of planetary gears and ball screw assemblies. The screw of the ball screw assembly can be attached to a tie rod end for steering the rear wheels of a vehicle.

A position sensor is mounted on the housing for sensing the position of the screw along a path of movement and generating a sensor signal representing that position. When the screw reaches the desired position, a brake means attached to the output shaft of the electric motor is actuated to stop the rotation of the output shaft and the linear movement of the screw.

In one embodiment, the position sensor includes a pair of Hall effect transducers mounted on the housing and spaced apart along the path and a pair of spaced apart magnets connected to the screw. Each of the magnets is associated with one of the transducers for generating an output signal from the associated transducer representing the position of the screw in one direction of movement along the path. In another embodiment, the pair of Hall effect transducers mounted on said housing on opposite sides of the path. The magnets are positioned transverse to the path for movement between the transducers for generating an output signal from the transducers representing the position of the screw along the path.

In another embodiment of the actuator, the planetary gear assembly is eliminated and an armature portion of the electric motor is mounted on the ball screw nut. A field portion of the motor is attached to the housing to rotate the armature and the nut together.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 is a fragmentary, cross-sectional view of a dual actuator according to the present invention;

FIG. 6 is a reduced size cross-sectional view of the dual actuator shown in FIG. 5;

FIG. 7 is a fragmentary cross-sectional view of an alternate embodiment of the actuator and the position sensor according to the present invention;

FIG. 8 is a top plan view of an alternate embodiment of the position sensor shown in FIG. 7; and FIG. 9 is a cross-sectional front elevation view of the position sensor shown in FIG. 8.

DESCRIPTION OF THE PREFERRED EMBODIMENT

Figure 1:
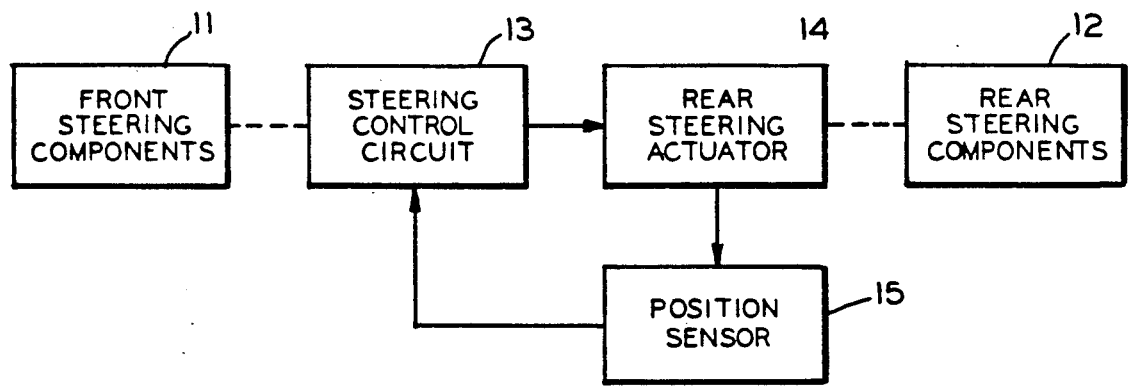
FIG. 1 is a block diagram of a vehicle steering control system incorporating an actuator according to the present invention.

The electric actuator according to the present invention has a wide variety of uses and can be built in many sizes depending upon the actuation distance and torque requirements. One use of the actuator is in an all-wheel steering system for a vehicle. In FIG. 1, there is a shown a block diagram representation of a vehicle steering system having front steering components 11 controlling the steering angle of the front wheels (not shown) and rear steering components 12 controlling the steering angle of the rear wheels (also not shown). In a typical automobile, the front steering components 11 would consist of a steering wheel connected to a steering column which in turn is connected to a mechanism for converting rotary to linear motion, such as a rack and pinion gear. The rack, in turn, is connected to front wheel tie rods which are connected to the vehicle wheels completing the mechanical linkage from the steering wheel. Since all of these elements are conventional, they are not shown in detail.

In an all-wheel steering vehicle, the rear wheels are also mounted for steering movement and are typically connected to tie rods. A steering control circuit 13 senses the position of the front steering components 11 by any conventional means such as a mechanical coupling or a magnetic sensor. The steering control circuit 13 generates a control signal to a rear steering actuator 14 which is connected to the tie rods of the rear steering components 12. The control signal directs the actuator 14 to move the rear steering components in a predetermined relationship to the position of the front steering components 11. A position sensor 15 is coupled to the actuator 14 to sense the steering position of the rear steering components 12 and to generate a sensor output signal to the steering control circuit 13. The sensor signal provides feedback to the steering control circuit 13 representing the actual position of the rear steering components 12 to enable the steering control circuit 13 to make any necessary corrections in the control signal generated to the rear steering actuator 14.

Figure 2:
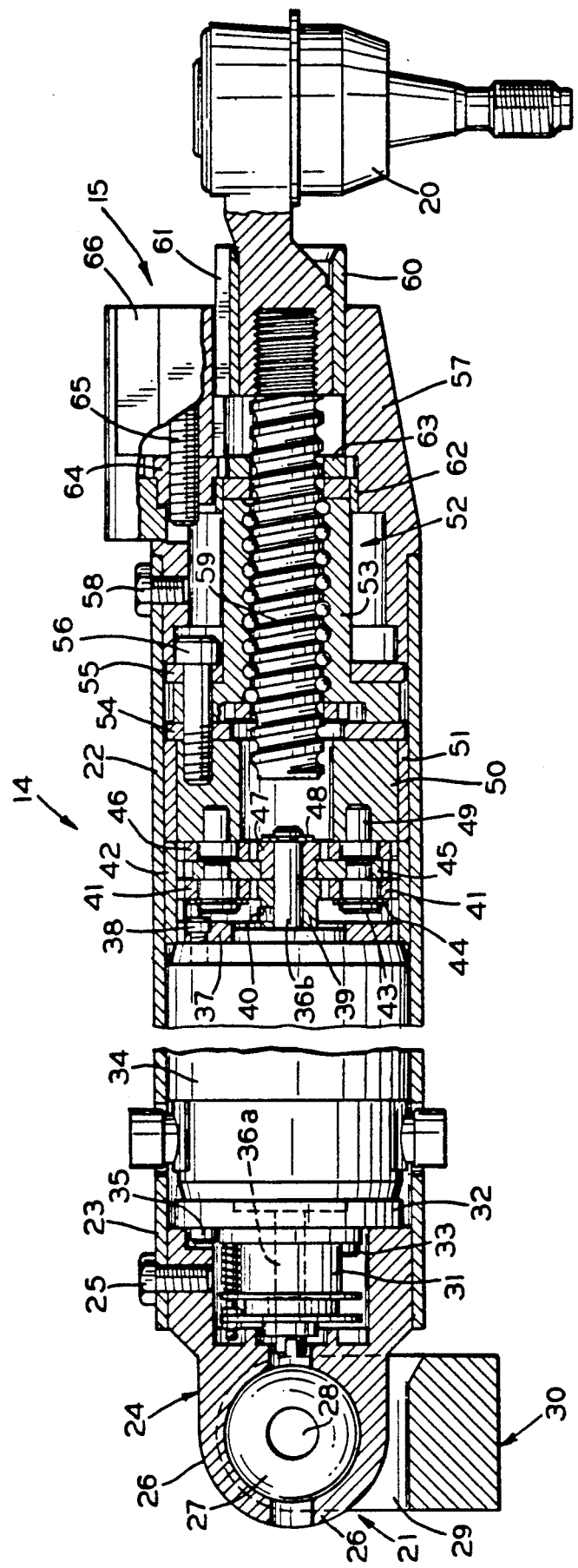
FIG. 2 is a cross-sectional view of the steering actuator and position sensor shown in FIG. 1.

The actuator 14 is shown in more detail in FIG. 2. One end of the actuator is connected to a tie rod end 20 and an opposite end of the actuator is connected to a clevis assembly 21. The actuator 14 includes an outer generally tubular housing 22 and one end of the housing 22 adjacent the clevis assembly 21 is attached to a generally tubular dovetail 23. Extending into the open end of the dovetail 23 is a pivot 24. A portion of the pivot 24 extending into the dovetail 23 has a generally cylindrical outer surface which abuts an inner surface of the dovetail 23. The pivot 24 is attached to the dovetail 23 by one or more threaded fasteners 25 which extend through an aperture formed in the wall of the dovetail 23 and threadably engage a threaded aperture formed in the cylindrical periphery of the dovetail 23. An outer end of the pivot 24 has a pair of curved arms 26 formed thereon. Facing inner surfaces of the arms 26 define spherical cups for rotatably retaining a ball 27. The ball 27 has a pair of pins 28 (only one is shown in FIG. 2) which extend in opposite directions along a diameter of the ball 27. The pins 28 each extend through apertures (not shown) formed in associated arms 29 (only one is shown) of a yoke 30. The yoke 30 can be attached to a fixed element of the vehicle such as the vehicle frame thereby allowing limited pivotable movement of the actuator 14.

The end pivot 24 extending into the dovetail 23 has a generally hollow interior for housing an electric brake assembly 31. The brake assembly 31 is mounted on a planar surface of a generally cylindrical adapter plate 32 by one or more fasteners, such as a threaded fastener 33. An opposite planar surface of the adapter 32 abuts an end of an electric motor 34 and is attached thereto by one or more threaded fasteners, such as a fastener 35. A drive or output shaft of the motor 34 has one end 36a which extends through the adapter plate 32 into the brake assembly 31. When the brake assembly 31 is actuated, a braking mechanism (not shown) engages the shaft end 36a and the motor 34 ceases rotation.

The motor shaft has another end 36b which extends outwardly from the opposite end of the motor 34 and is attached to the input of a planetary gear set. An annular lock gear 37 is attached to an end of the motor 34 facing the tie rod end 20 by a plurality of fasteners such as a threaded fastener 38. The shaft end 36b extends through a drive gear 39 adjacent the lock gear 37 and the drive gear 39 is attached to the motor shaft end 36b by a set screw 40 to prevent rotation therebetween. The drive gear 39 engages a plurality of planetary gears 41 positioned about the shaft end 36b in the interior of the housing 22. The planetary gears 41 engage an internal spur gear 42 which is generally cylindrical in shape and is mounted in the interior of the housing 22. The spur gear 42 has internal longitudinally extending teeth which engage both the planetary gears 41 and external teeth formed on the lock gear 37.

As the motor 34 rotates the shaft end 36b, the drive gear 39 will rotate driving the planetary gears 41 in rotation about the inner periphery of the internal spur gear 42. Each of the planetary gears 41 has a pin 43 extending through the center thereof. The planetary gears 41 are prevented from moving on the pins 43 toward the motor 34 by snap rings 44 engaging cylindrical grooves formed in the pins 43. A smaller diameter end of each of the pins 43 extends beyond the planetary gears 41 and into apertures formed in a planetary plate 45. On the opposite side of the plate 45 is another set of planetary gears 46 driven by a drive gear 47 rotatably mounted on the shaft end 36b. The plate 45 is attached to the drive gear 47 such that the planetary gears 46 are rotated about the interior periphery of the spur gear 42. The drive gears 39 and 47 are held on the shaft 36 by a snap ring 48 engaging a groove formed in the outer end of the shaft 36. Each of the planetary gears 46 is rotatably mounted on the head of a pin 49 having a reduced diameter portion extending into a drive ring 50. The drive ring 50 is rotatably mounted in a low friction material bushing 51 which in turn abuts an interior surface of the housing 22.

The drive ring 50 is attached to the nut of a ball screw assembly 52 mounted in the housing 22. The ball screw assembly 52 includes a rotatable nut 53 having a radially outwardly extending flange positioned between a pair of thrust washers 54 and 55. The thrust washers 54 and 55 are typically formed of a low friction material and the washer 54 abuts the end of the drive ring 50 opposite the planetary gears 46. One or more threaded fasteners 56 extend through apertures formed in the thrust washer 55, the flange of the nut 53 and the thrust washer 54 and threadably engage the drive ring 50. A generally cylindrical tapered end cap 57 extends into the open end of the housing 22 and abuts the thrust washer 55. The cap 57 is attached to the housing 22 by one or more threaded fasteners 58 which extend through apertures formed in the housing 22 and threadably engage apertures formed in the cap 57. The cap 57 has a generally hollow interior into which the nut 53 and an associated screw 59 of the ball screw assembly 52 extend. An outer end of the screw 59 is threaded to engage a threaded aperture formed in the tie rod end 20. A portion of the tie rod end 20 is generally cylindrical in shape and is retained in a generally tubular guide 60. An outer surface of the guide 60 has a longitudinally extending slot formed therein for retaining a key 61 which also engages a similar slot formed in the interior of the cap 57 to prevent rotation of the tie rod end 20 and the attached screw 59.

The end of the ball screw nut 53 closest to the tie rod end 20 is rotatably mounted in a bushing 62 formed of a low friction material. Adjacent the bushing 62 and attached to the end of the nut 53 is an annular wiper gear 63. The wiper gear 63 engages an actuator gear 64 mounted in a cavity formed in the cap 57. The actuator gear 64 is threadably engaged on a threaded shaft 65 which is coupled to the position sensor 15 as discussed below. The motor output shaft, the planetary gear set and the ball screw assembly share a common longitudinal axis with the housing 22.

The actuator 14 operates in the following manner. When a control signal is generated by the steering control circuit 13 of FIG. 1, electric power is supplied to the motor 34 the output shaft is rotated thereby turning the drive gear 39. The drive gear 39 in turn rotates the planetary gears 41 which rotate about the interior surface of the internal spur gear 42. The movement of the planetary gears 41 rotates the planetary plate 45 which is attached to the drive gear 47. The drive gear 47 rotates the planetary gears 46 about the interior of the internal spur gear 42 thereby driving the drive ring 50 in rotation. The drive ring 50 rotates the nut 53 causing the screw 59 to move along a path parallel to its longitudinal axis in a direction related to the direction of rotation of the motor shaft end 36b. The linear movement of the screw 59 moves the tie rod end 20 which is attached to a rear wheel (not shown) of the vehicle to change the turning angle of such wheel. Since the motor 34 does not stop rotating immediately when the power is turned off, the electric brake 31 is actuated when the desired steering angle is attained to immediately stop the rotation of the motor shaft end 36b. The planetary gear set provides a reduction in speed and an increase in torque between the motor output and the ball screw assembly. The torque and speed output of the motor 34, the ratio of the planetary gear sets and the lead of the ball screw 52 are all selected to provide desired values of linear travel of the tie rod end 20 in an acceptable travel time.

Figure 3:
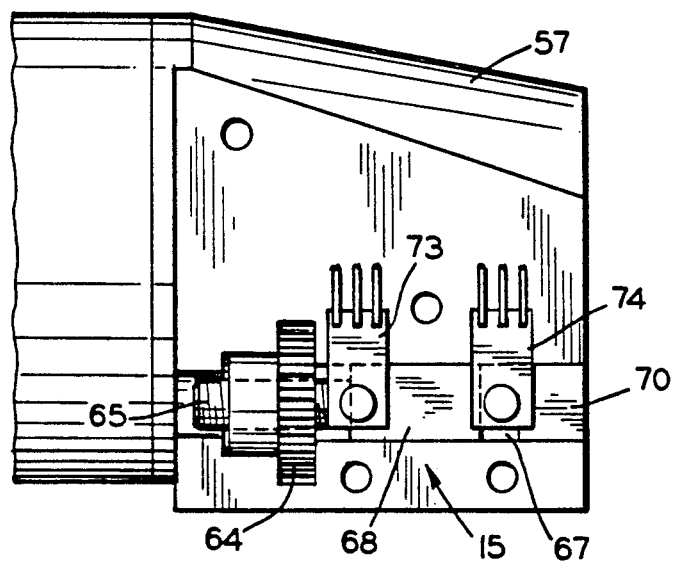
FIG. 3 is top plan view of the position sensor shown in FIGS. 1 and 2.
Figure 4:
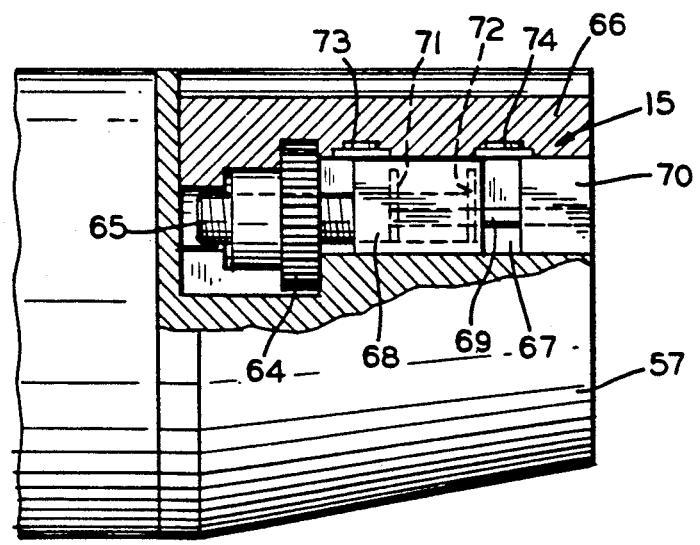
FIG. 4 is a fragmentary side elevation view of the position sensor shown in FIG. 3.

Since the position of the tie rod end 20 is representative of the steering angle, a position feedback signal can be generated by sensing the linear travel of the ball screw 59. In FIG. 2, there is shown a cover 66 removeably attached over a cavity formed in the cap 57. As shown more clearly in FIGS. 3 and 4, the threaded shaft 65 and the actuator gears 64 are mounted in a longitudinally extending cavity 67. In FIG. 3, the cover 66 is removed and in FIG. 4, a portion of the cover 66 and a portion of the cap 57 are cut away. A magnetic actuator 68 is slidably mounted in the cavity 67 and connected at one end to the threaded shaft 65. An opposite end of the actuator 68 has a pin 69 extending therefrom into an aperture formed in a block 70 positioned at an outer end of the cavity 67. The actuator 68 includes a pair of longitudinally spaced apart magnets 71 and 72. Mounted on an outer surface of the cap 57 and extending over the cavity 67 are a pair of linear output Hall effect transducers 73 and 74 spaced apart along the longitudinal axis of the cavity. In FIG. 4, when the magnet 71 travels from the position shown toward the center of the transducer 73, the transducer 73 will generate a sensor signal with an output voltage having a magnitude representing the distance traveled thereby indicating the distance the screw 59 has retracted the tie rod end 20 toward the actuator 14. Conversely, when the magnet 72 is moved from the position shown toward the center of the transducer 74, the transducer 74 will generate a sensor signal with an output voltage having a magnitude representing the distance moved thereby indicating the amount by which the screw 59 and the tie rod end 20 have been extended from the actuator 14.

As discussed above, the actuator 14 shown in FIG. 2 can be utilized to steer a single vehicle rear wheel. There is shown in FIGS. 5 and 6, a dual actuator for steering both rear wheels. A dual actuator 80 has opposite ends thereof connected to a pair of ball joints 81 and 82. The ball joints 81 and 82, in turn, are connected to tie rod ends (not shown) for the rear wheels of a vehicle. The left hand portion of the dual actuator 80 is similar to the single actuator shown in FIG. 2. An electric motor 84 is mounted inside a generally tubular housing 85. One end 86a of a drive shaft of the motor 84 extends into an electric brake assembly 87. The opposite end of the drive shaft 86b engages a planetary gear assembly 88 which is coupled to a drive ring 89 which in turn drives a ball screw assembly 90. A screw 91 of the ball screw assembly 90 threadably engages a threaded aperture formed in an end of a rod 92 attached to the cup of the ball joint 82. A position sensor 93 is retained in a cavity formed in a generally cylindrical cap 94 extending into and attached to the open end of the housing 85. The position sensor is coupled to the rod 90 by a pin 94 which is free to move back and forth in a slot 96 formed in the interior wall of the cap 94 and the cavity. The width of the slot is dimensioned to prevent rotation of the rod 92 and the screw 91 about their common longitudinal axis.

The motor shaft end 86a extends through the brake 87 and is coupled to drive a planetary gear assembly 97 similar to the gear assembly 88. The planetary gear assembly 97 is coupled to drive a drive ring 98 similar to the drive ring 89. In turn, the drive ring 98 is attached to a ball screw assembly 99. A screw 100 of the ball screw assembly 99 threadably engages a rod 102 attached to a cup of the ball joint 81. The screw 100 and the rod 101 extend through the interior of a generally tubular cap 102 which extends into and is attached to an open end of a dovetail 103. The dovetail 103 is similar to the dovetail 23 of FIG. 2 and is attached to the housing 85. A pin 104 is attached to the rod 101 and extends into a longitudinally extending slot 105 formed in the cap 102 to prevent rotation of the rod 101 and the screw 100 about their common longitudinal axis.

When the motor 84 is actuated, the screws 91 and 100 are driven in the same direction along their longitudinal axes to turn the associated wheels of the vehicle in the same direction. The brake 87 functions in the same manner as the brake 31 in FIG. 2 to stop the rotation of the motor shaft.

The position sensor 93 is shown in more detail in Figs. 8 and 9 as described below. However, the position sensor 93 can also be utilized with an alternate embodiment of the ball screw assembly. In FIG. 7, a ball screw assembly 110 is shown having a nut 111 and a screw 112. The screw 112 has a threaded end 113 adapted to engage a tie rod end (not shown). However, instead of having the nut 111 rotated by an electric motor driving through a planetary gear assembly, as shown in FIGS. 2 and 5, the nut 111 forms a portion of the armature of an electric motor. For example, a motor field 114 can be fixedly attached to the interior of an actuator housing (not shown) and adjacent to the but 111. An armature 115 of the motor is mounted on the exterior of the nut 111 for rotation therewith. The field 114 and the armature 115 could both be wound coils or one could be formed from permanent magnets. When the motor is actuated, the nut 111 rotates as part of the armature to move the screw 112 in a linear direction along its longitudinal axis. A pair of thrust washers 116 and 117 can be fixedly mounted in the actuator housing for rotatably retaining an radially outwardly extending flange 118 formed on the nut 111. The position sensor 93 can be mechanically coupled as by a linkage 119 to the screw 112. As the linkage 119 moves back and forth in the direction of a double headed arrow 120, the position sensor will generate signals representing the resulting steering angle.

As shown in FIGS. 8 and 9, a cavity 130 is formed in the cap 94 of FIGS. 5 and 6. Slideably retained in the cavity 130 is a magnet assembly 131 including a pair of magnets 132 and 133. The magnets can be enclosed by a low friction material such as a molded plastic with opposite poles adjacent one another. If the position sensor 93 is utilized in the dual actuator shown in FIGS. 5 and 6, the upper end of the pin 95 is attached to the bottom surface of the magnet assembly 131. If the position sensor 93 is utilized with the actuator configuration shown in FIG. 7, the linkage 119 is attached to one end of the magnet assembly 131 as shown Figs. 8 and 9.

The magnet assembly 131 slides in the cavity 130 past a pair of fixed opposed Hall effect transducers 134 and 135. The opposite orientation of the magnetic poles of magnets 132 and 133 will generate opposite polarity similar magnitude signals from the transducers 134 and 135 which signals will indicate the direction and distance of movement of the magnet assembly 131 and thus the steering angle of any associated wheel.

Although the various embodiments of the actuator according to the present invention have been described in connection with the operation of a steering mechanism for a vehicle, the actuators can be utilized to provide precise linear movement to any object desired.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An electrically powered actuator for moving an object along a linear path comprising:
   a generally tubular housing:
   an electric motor enclosed in said housing and having a rotatable output shaft, said output shaft having first and second ends;
   a first planetary gear set enclosed in said housing and having an input attached to said first end of said output shaft and an output;
   a first ball screw assembly enclosed in said housing and having a rotatable nut attached to said first planetary gear set output and a screw driven along a linear path of movement by said nut and adapted to be attached to an object to be moved, said output shaft, said first planetary gear set and said first ball screw assembly sharing a common longitudinal axis with said housing;
   a second planetary gear set enclosed in said housing and having an input attached to said second end of said output shaft and an output;
   a second ball screw assembly enclosed in said housing and having a rotatable nut attached to said second planetary gear set output and a screw driven along a linear path of movement by said nut and adapted to be attached to an object to be moved, said output shaft, said second planetary gear set and said second ball screw assembly sharing a common longitudinal axis with said housing; and
   brake means attached to said output shaft whereby when said electric motor is actuated, said output shaft rotates said planetary gear sets and said nuts to move said screws along said path of movement and when said first ball screw assembly screw reaches a predetermined position along said path, said brake means is actuated to stop the rotation of said output shaft.

2. The actuator according to claim 1 including a position sensor mounted on said housing for sensing the position of said screw along said path of movement and generating a sensor signal representing said position.

3. The actuator according to claim 2 wherein said position sensor includes a pair of spaced apart Hall effect transducers mounted on said housing and a pair of spaced apart magnets connected to said output shaft, each of said magnets being associated with one of said transducers for generating an output signal from said associated transducer representing the position of said screw in one direction of movement along said path.

4. An electrically powered actuator for moving an object along a linear path comprising:
   a housing;
   an electric motor enclosed in said housing and having a rotatable output shaft;
   a planetary gear set enclosed in said housing and having an input attached to said output shaft and an output;
   a ball screw assembly enclosed in said housing and having a rotatable nut attached to said planetary gear set output and a screw adapted to be attached to an object to be moved;
   a position sensor mounted on said housing for sensing the position of said screw along a path of movement and generating a sensor signal representing said position, said position sensor including a pair of spaced apart Hall effect transducers mounted on said housing and a pair of spaced apart magnets connected to said shaft, each of said transducers being responsive to at least one of said magnets for generating said sensor signal as an output signal representing movement of said screw in an associated direction of travel along said path of movement; and
   brake means attached to said output shaft whereby when said electric motor is actuated, said output shaft rotates said planetary gear set and said nut to move said screw along said path of movement and when said screw reaches a predetermined position along said path, said brake means is actuated to stop the rotation of said output shaft.

5. The actuator according to claim 4 wherein each of said magnets is associated with one of said transducers for generating said output signal from said associated transducer representing the position of said screw in one direction of movement along said path, said magnets being positioned between said transducers.

6. The actuator according to claim 4 wherein said magnets are positioned for movement between said transducers for generating said output signal from said transducers representing the position of said screw along said path.

7. A steering actuator for a wheeled vehicle comprising:
- a generally tubular housing;
- an electric motor enclosed in said housing and having a rotatable output shaft;
- a ball screw assembly enclosed in said housing and having a rotatable nut attached to said electric motor output shaft and a screw adapted to be attached to a tie rod end of a vehicle steering system, said electric motor including a field portion mounted in said housing adjacent said nut and an armature portion mounted on said nut for rotation therewith;
- a position sensor mounted on said housing for sensing the position of said screw along a path of movement and generating a sensor signal representing said position; and
- brake means attached to said output shaft whereby when said electric motor is actuated, said electric motor rotates said nut to move said screw along said path of movement and when said screw reached a predetermined position along said path, said brake means is actuated to stop the rotation of said output shaft of said electric motor.

8. A steering actuator for a wheeled vehicle steering system for moving a tie rod end a predetermined linear distance comprising:
- a generally tubular housing;
- an electric motor enclosed in said housing and having a rotatable output shaft;
- a planetary gear set enclosed in said housing and having an input attached to said output shaft and an output;
- a ball screw assembly enclosed in said housing and having a rotatable nut attached to said planetary gear set output and a screw adapted to be attached to a tie rod end to be moved;
- a position sensor including a pair of spaced apart Hall effect transducers mounted on said housing and a pair of spaced apart magnets connected to said output shaft and positioned between said transducers, each of said magnets being associated with at least one of said transducers for generating an output signal from said associated transducer representing the position of said screw in at least one direction of movement along a path of movement; and
- brake means attached to said output shaft whereby when said electric motor is actuated, said output shaft rotates said planetary gear set and said nut to move said screw along said path of movement and when said screw reaches a predetermined position along said path, said brake means is actuated to stop the rotation of said output shaft.

* * * * *